US008524073B2

(12) United States Patent
Osaheni et al.

(10) Patent No.: US 8,524,073 B2
(45) Date of Patent: Sep. 3, 2013

(54) SURFACE MODIFIED SORBENT

(75) Inventors: John Aibangbee Osaheni, Clifton Park, NY (US); Thomas Joseph Fyvie, Schenectady, NY (US); Gregory Allen O'Neil, Clifton Park, NY (US); Deborah Ann Haitko, Schenectady, NY (US); Grigorii Lev Soloveichik, Latham, NY (US); Paul Burchell Glaser, Albany, NY (US)

(73) Assignee: General Electric Company, Niskayuna, NY (US)

( * ) Notice: Subject to any disclaimer, the term of this patent is extended or adjusted under 35 U.S.C. 154(b) by 446 days.

(21) Appl. No.: 12/409,041

(22) Filed: Mar. 23, 2009

(65) Prior Publication Data
US 2010/0236989 A1 Sep. 23, 2010

(51) Int. Cl.
*B01J 27/02* (2006.01)

(52) U.S. Cl.
USPC ........... 208/250; 208/413; 208/423; 208/421; 208/52 R; 208/59; 502/28; 502/31

(58) Field of Classification Search
USPC ................. 208/210, 250; 502/219, 220, 221
See application file for complete search history.

(56) References Cited

U.S. PATENT DOCUMENTS

| | | | | |
|---|---|---|---|---|
| 3,856,664 | A | | 12/1974 | Whitehurst |
| 4,119,531 | A | * | 10/1978 | Hopkins et al. ............ 208/251 H |
| 4,297,242 | A | * | 10/1981 | Hensley et al. ............... 502/220 |
| 4,456,700 | A | * | 6/1984 | Oleck et al. .................... 502/220 |
| 4,707,466 | A | * | 11/1987 | Beaton et al. .................. 502/313 |
| 5,089,463 | A | | 2/1992 | Johnson |
| 6,403,031 | B1 | * | 6/2002 | Escude et al. .................... 422/28 |
| 6,855,653 | B2 | | 2/2005 | Pulikottil et al. |
| 7,029,574 | B2 | | 4/2006 | Yang et al. |
| 7,148,389 | B2 | | 12/2006 | Yang et al. |
| 7,314,545 | B2 | | 1/2008 | Karas et al. |
| 2008/0083672 | A1 | * | 4/2008 | Dong et al. ..................... 210/660 |
| 2008/0128328 | A1 | * | 6/2008 | Nicolaos et al. ............. 208/210 |
| 2009/0057202 | A1 | | 3/2009 | Kulkarni et al. |

FOREIGN PATENT DOCUMENTS

| | | |
|---|---|---|
| EP | 1283072 A1 | 2/2003 |
| WO | WO2005054410 A1 | 6/2005 |
| WO | WO2005069767 A2 | 8/2005 |
| WO | WO2005116169 A1 | 12/2005 |

OTHER PUBLICATIONS

EP10157024 Search Report, Jan. 10, 2011.
M. E. Mahmoud et al., Silica-immobiized formylsalicylic acid as a selective phas for the extraction of iron(III), Elsevier, Talanta, vol. 44, 1997, pp. 15-22.
Hernandez-Maldonado et al., "New Sorbents for Desulfurization of Diesel Fuels via pi-Complexation", AIChE Journal, vol. 50 (4), pp. 791-801, 2004.
Hernandez-Maldonado et al., "Desulfurization of Transportation Fuels by pi-Complexation Sorbents: Cu(I)-, Ni(II)-, and Zn(II)-Zeolites", Applied Catalysis B: Environmental, vol. 56 (1-2 SPEC. ISS.), pp. 111-126, 2005.
Yang et al., "Desulfurization of Transportation Fuels with Zeolites Under Ambient Conditions", Science, vol. 301 (5629), pp. 79-81, 2003.
S.G. McKinley et al., Deep desulfurization by selective adsorption of dibenzothiophenes on Ag+/SBA-15 and Ag+/SiO2, Chem Comm Communication, 2003, pp. 2620-2621.
P. Jeevanandam et al., "Adsorption of thiophenes out of hydrocarbons using metal impregnated nanocrystalling aluminum oxide," Science Direct, Microporous and Mesoporous Materials, vol. 79, 2005, pp. 101-110.

* cited by examiner

*Primary Examiner* — Melvin C Mayes
*Assistant Examiner* — Colette Nguyen
(74) *Attorney, Agent, or Firm* — Fletcher Yoder, P.C.

(57) ABSTRACT

Disclosed herein is a sorbent composition including an adsorbent support; and a metal component comprising a transition metal, wherein the metal component is impregnated on a surface of the adsorbent support; and wherein the metal component effects the removal of sulfur and vanadium from a hydrocarbon fuel. Also disclosed herein is a sorbent composition comprising an adsorbent support, wherein a surface of the adsorbent support has been chemically modified to comprise functional groups; and wherein the adsorbent support effects the removal of sulfur and vanadium from a hydrocarbon fuel.

15 Claims, No Drawings

SURFACE MODIFIED SORBENT

FIELD OF THE INVENTION

The invention includes embodiments that relate to a surface modified sorbent for the removal of sulfur and vanadium from a hydrocarbon fuel.

BACKGROUND OF THE INVENTION

The presence of certain components in petroleum and petroleum derived fuels can prevent or limit their use in combustion processes due to operational or regulatory limitations. For instance, the level of sulfur in available fuels can limit the size of a power generation installation due to emissions constraints. In addition, the presence of vanadium impurities can cause corrosion of gas turbine blades.

Selectively removing undesirable components from fuels before their combustion can allow their use in previously inaccessible applications. Currently used refinery technologies including hydrodemetallation and hydrodesulfurization are designed for the extraction of light fractions, and use of these processes is costly, especially in small scale applications.

Sorbent technology, in which fuel is contacted with a solid material capable of selectively adsorbing or absorbing contaminants are an alternative to traditional, capital-intensive refinery processes which rely on fractional distillation, hydrotreating, catalytic cracking, etc.

While sorbent processes can provide advantages over refinery processes, they can be limited by the availability of only a narrow window of intrinsic surface properties of the sorbent, such as polarity, pH, or wettability. It is therefore desirable to have a sorbent that comprises a greater range of properties and an increased ability to remove undesirable components, while retaining the overall structural features of the sorbent.

BRIEF DESCRIPTION OF THE INVENTION

In one embodiment, a sorbent composition comprises an adsorbent support; and a metal component comprising a transition metal, wherein the metal component is impregnated on a surface of the adsorbent support; and wherein the metal component effects the removal of sulfur and vanadium from a hydrocarbon fuel.

In another embodiment, a method of removing sulfur and vanadium from a hydrocarbon fuel is provided. The method comprises contacting the fuel with a sorbent composition, wherein the sorbent composition comprises an adsorbent support; and a metal component comprising a transition metal, wherein the metal component is impregnated on a surface of the adsorbent support; and wherein the metal component effects the removal of sulfur and vanadium from the hydrocarbon fuel.

In another embodiment, a sorbent composition comprises an adsorbent support, wherein a surface of the adsorbent support has been chemically modified to comprise functional groups; and wherein the adsorbent support effects the removal of sulfur and vanadium from a hydrocarbon fuel.

In yet another embodiment, a method of removing sulfur and vanadium from a hydrocarbon fuel is provided. The method comprises contacting the fuel with a sorbent composition, wherein the sorbent composition comprises an adsorbent support, wherein a surface of the adsorbent support has been chemically modified to comprise functional groups; and wherein the adsorbent support effects the removal of sulfur and vanadium from a hydrocarbon fuel.

Other features and advantages of the present invention will be apparent from the following detailed description.

DETAILED DESCRIPTION OF THE INVENTION

Disclosed herein are sorbent compositions for removing sulfur and/or vanadium from hydrocarbon fuels. In one embodiment, the sorbent composition comprises an adsorbent support and a metal component impregnated on the surface of the adsorbent support. In another embodiment, the sorbent composition comprises an adsorbent support having a chemically modified surface.

The term "sulfur" denotes sulfur in any form such as elemental sulfur or a sulfur compound normally present in a hydrocarbon-containing fluid such as cracked gasoline or diesel fuel. Examples of sulfur which can be present during a process of the present invention usually contained in a hydrocarbon-containing fluid, include, but are not limited to, hydrogen sulfide, carbonyl sulfide (COS), carbon disulfide ($CS_2$), mercaptans (RSH), organic sulfides (R—S—R), organic disulfides (R—S—S—R), thiophene, substituted thiophenes, organic trisulfides, organic tetrasulfides, benzothiophene, dibenzothiophenes, alkyl thiophenes, alkyl benzothiophenes, alkyl dibenzothiophenes, and the like and combinations thereof as well as the heavier molecular weights of the same, wherein each R can be an alkyl or cycloalkyl or aryl group containing one carbon atom to ten carbon atoms.

The term "fluid" denotes gas, liquid, vapor, and combinations thereof.

As used herein, "heavy hydrocarbon" is defined as a hydrocarbon molecule having at least 6 carbon atoms, and a "heavy hydrocarbon fuel" is defined as a liquid mixture of heavy hydrocarbons.

The term "metal" denotes metal in any form such as elemental metal or a metal-containing compound.

The term "metal oxide" denotes a metal oxide in any form such as a metal oxide or a metal oxide precursor.

The term "adsorbent" as used herein, denotes a material that has the ability to extract sulfur and/or vanadium from gases, liquids, or solids by causing the sulfur and/or vanadium to adhere to its internal surface without changing the adsorbent material physically or chemically.

The term "adsorbent support" denotes any material or combination of such materials which is an adsorbent and can be used as a support for the metal component disclosed herein. In one embodiment, the adsorbent support comprises a porous material. Examples of suitable porous materials include, but are not limited to micro-porous materials and mesoporous materials.

Examples of suitable adsorbent supports include, but are not limited to, porous inorganic materials including metal oxides, inorganic oxides, inorganic carbides, inorganic nitrides, inorganic hydroxides, inorganic oxides having a hydroxide coating, inorganic carbonitrides, inorganic oxynitrides, inorganic borides, inorganic borocarbides, and the like, and combinations thereof. Examples of suitable inorganic oxides include silica, alumina, titania, zirconia, ceria, manganese oxide, zinc oxide, iron oxides, calcium oxide, manganese dioxide, or combinations comprising at least one of the foregoing inorganic oxides. Examples of inorganic carbides include silicon carbide, titanium carbide, tantalum carbide, tungsten carbide, hafnium carbide, or the like, or a combination comprising at least one of the foregoing carbides. Examples of suitable nitrides include silicon nitrides, titanium nitride, or the like, or a combination comprising at least one of the foregoing. Examples of suitable borides are lanthanum boride, chromium borides, molybdenum borides, tungsten boride, or the like, or combinations comprising at least one of the foregoing borides.

Examples of suitable organic material for use in the adsorbent support, include but are not limited to, activated carbon, coke, charcoal, carbon-containing molecular sieves, and the like and combinations thereof.

The adsorbent support may have a surface area greater than about 0.5 $m^2$/gram. In one embodiment, the surface area is in a range of from about 0.5 $m^2$/gram to about 2000 $m^2$/gram. In another embodiment, adsorbent support has a surface area is in a range of from about 200 $m^2$/gram to about 1000 $m^2$/gram. In another embodiment, the surface area is in a range of from about 300 $m^2$/gram to about 800 $m^2$/gram. In yet another embodiment, the adsorbent support has a surface area that is in a range from about 350 $m^2$/gram to about 700 $m^2$/gram.

Desirably, the adsorbent support is present in an amount of about 20 weight percent to about 100 weight percent, based upon the total weight of the sorbent composition. In one embodiment the adsorbent support is present in an amount of about 20 weight percent to about 99.9 weight percent, based upon the total weight of the sorbent composition. In one embodiment the adsorbent support is present in an amount of about 50 weight percent to about 99.5 weight percent, based upon the total weight of the sorbent composition. In an exemplary embodiment, the adsorbent support is present in an amount of about 70 weight percent to about 99.0 weight percent, based upon the total weight of the sorbent composition.

The adsorbent support may be in the form of particles. The adsorbent support may comprise materials having an average particle size of about 1 micrometer to about 5 millimeters. In one embodiment, the adsorbent support has an average particle size of about 5 micrometers to about 2 millimeters. In another embodiment, the adsorbent support has an average particle size of about 10 micrometers to about 1 millimeter.

In one embodiment, chemically modifying the surface of the adsorbent support can significantly improve the ability of the sorbent composition to remove sulfur and vanadium from the hydrocarbon fuel. For example, the surface of the adsorbent support can be chemically modified to increase the specificity of the adsorbent support for sulfur and/or vanadium, or to improve the kinetics of sorption by increasing wetting and deep-pore infiltration of adsorbent support. Any method known to those having skill in the art may be used to chemically modify the surface of the adsorbent support, thereby allowing for the attachment of a wide range of chemical functionality to the surfaces. For example, alkoxysilanes, chlorosilanes, or silazanes can be used to functionalize the adsorbent support surface, and more particularly, functionalize the polar hydroxyl groups present in silica. In some embodiments halo, phenyl, cyano, alkyl, alkenyl, aryl, alkoxy, silano, or chloro functionality, or a combination thereof, can provide improved sorption by the adsorbent support. Also, metal chelating functionality of the adsorbent support surface with hydroxyquinoline, cupferron, and the like, can improve the removal of vanadium and other metal containing impurities from the hydrocarbon fuel.

The term "metal component" as used herein, denotes any metal or metal-containing compound which can be added to the surface of the adsorbent support to aid in the removal of sulfur and/or vanadium from a hydrocarbon fuel. The metal component may be a metal oxide. In a preferred embodiment, the metal component comprises a transition metal. Examples of suitable metal components include, but are not limited to copper, silver, platinum, gold, molybdenum, tungsten, rhenium, palladium, iron, nickel, cobalt, ruthenium, rhodium, osmium, iridium, and the like, and combinations thereof. In an exemplary embodiment, the metal component comprises silver or iron.

In embodiments wherein the metal component is present in the sorbent composition, the metal component may exist in an amount of about 0.1 weight percent to about 80 weight percent, based upon the total weight of the sorbent composition. In one embodiment, the metal component is present in an amount of about 0.5 weight percent to about 50 weight percent, based upon the total weight of the sorbent composition. In an exemplary embodiment, the metal component is present in an amount of about 1.0 weight percent to about 30 weight percent, based upon the total weight of the sorbent composition.

In one embodiment, the adsorbent support and metal component are combined to form the sorbent composition, wherein the metal component is impregnated on at least a portion of the surface of the adsorbent support. In one embodiment, the metal component can be impregnated within the mesopores or micropores of the adsorbent support. The metal component may be combined with an adsorbent support having a chemically modified surface as described hereinabove. If the adsorbent support is in the form of particles, the metal component is impregnated on the surface of the adsorbent support particles. Any method known to those skilled in the art may be used to combine the metal component and adsorbent support. For example, suitable techniques for impregnating the surface of the adsorbent support with the metal component include gas-phase treatment, wet loading, ionic exchange, an incipient wetness process, or in-situ precipitation during sol-gel processing.

The sorbent composition can remove sulfur and vanadium from fuels including, but not limited to Saudi heavy crude oil, Saudi light crude oil, Chilean crude oil, diesel fuel, and the like. The sorbent composition is particularly effective in the removal of sulfur and vanadium from heavy hydrocarbon fuels.

As stated above, the adsorbent support and/or the metal component present in the sorbent composition can effect the removal of the unwanted materials from the hydrocarbon fuel. In one embodiment, the sorbent composition is effective for removing from about 1.0 weight percent to about 100 weight percent sulfur from a fuel based on the total weight of sulfur in the fuel prior to treating the fuel with the sorbent composition. In one embodiment, the sorbent composition removes from about 10 weight percent to about 90 weight percent sulfur from a fuel. In another embodiment, the sorbent composition removes from about 20 weight percent to about 80 weight percent sulfur from a fuel. In yet another embodiment, the sorbent composition removes from about 40 weight percent to about 60 weight percent sulfur from a fuel based on the total weight of sulfur in the fuel prior to treating the fuel with the sorbent composition.

In one embodiment, the sorbent composition is effective for removing from about 1.0 weight percent to about 100 weight percent vanadium from a fuel based on the total weight of vanadium in the fuel prior to treating the fuel with the sorbent composition. In one embodiment, the sorbent composition removes from about 10 weight percent to about 90 weight percent vanadium from a fuel. In another embodiment, the sorbent composition removes from about 20 weight percent to about 80 weight percent vanadium from a fuel. In yet another embodiment, the sorbent composition removes from about 40 weight percent to about 60 weight percent vanadium from a fuel based on the total weight of vanadium in the fuel prior to treating the fuel with the sorbent composition.

The removal of sulfur and/or vanadium from the fuel can be accomplished in a single or a multiple-step adsorption process. Also, the sorbent composition can be used to remove additional unwanted materials present in the fuel, such as nickel.

The following examples, which are meant to be exemplary, not limiting, illustrate compositions and methods of manufacturing of some of the various embodiments described herein.

EXAMPLES

Example 1

A sorbent composition comprising carbon impregnated with silver was used to treat an oil feed of petroleum ether and Saudi light crude oil. The ratio of petroleum ether to Saudi light oil was 4:1.

The results shown in Table 1 indicate that the sorbent composition comprising carbon and silver was more effective at removing sulfur from the oil than the use of carbon alone.

TABLE 1

| Carbon weight (gm) | Wt. % Silver in Carbon | Feed Oil weight (gm) | Wt. % Sulfur removed | Wt. % Vanadium removed | Wt. % Nickel removed |
| --- | --- | --- | --- | --- | --- |
| 0.5 | 0 | 5.0 | 6.59 | N/A | N/A |
| 0.5 | 1 | 5.0 | 16.59 | N/A | N/A |
| 1.0 | 0 | 5.0 | 12.50 | 0.98 | N/A |
| 1.0 | 1 | 5.0 | 28.64 | 20.59 | 14.81 |
| 2.0 | 0 | 5.0 | 16.82 | 8.82 | 7.41 |
| 2.0 | 1 | 5.0 | 47.05 | 44.12 | 40.74 |

Example 2

A sorbent composition comprising mesoporous alumina impregnated with silver and iron was used to treat an oil feed of petroleum ether and Saudi light crude oil. The ratio of petroleum ether to Saudi light oil was 1:4.

The results displayed in Table 2, indicate the sorbent composition was more effective at removing sulfur from the oil than the use of the mesoporous alumina alone.

TABLE 2

| Mesoporous Alumina (MPA) weight (gm) | Wt. % Silver in MPA | Wt. % Iron in MPA | Feed Oil weight (gm) | Wt. % Sulfur removed |
| --- | --- | --- | --- | --- |
| 1 | 0 | 0 | 5 | 34.77 |
| 1 | 3 | 0.1 | 5 | 49.09 |
| 1 | 3 | 1 | 5 | 50.23 |

All ranges disclosed herein are inclusive of the endpoints, and the endpoints are combinable with each other. The terms "first," "second," and the like as used herein do not denote any order, quantity, or importance, but rather are used to distinguish one element from another. The modifiers "about" and "approximately" used in connection with a quantity are inclusive of the stated value and have the meaning dictated by the context (e.g., includes the degree of error associated with measurement of the particular quantity). The use of the terms "a" and "an" and "the" and similar referents in the context of describing the invention (especially in the context of the following claims) are to be construed to cover both the singular and the plural, unless otherwise indicated herein or clearly contradicted by context.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed:

1. A sorbent composition comprising:
an organic adsorbent support having a surface area in a range of from about 300 m$^2$/gram to about 800 m$^2$/gram; and
a metal component comprising a transition metal, wherein the metal component is impregnated on a surface of the adsorbent support; and
wherein the sorbent composition removes sulfur and vanadium from a hydrocarbon fuel.

2. The sorbent composition of claim 1, wherein the adsorbent support is present in an amount between about 20 weight percent to about 99.9 weight percent and the metal component is present in an amount between about 0.1 weight percent to about 80 weight percent based upon the weight of the sorbent composition.

3. The sorbent composition of claim 1, wherein the transition metal comprises copper, silver, platinum, gold, molybdenum, tungsten, rhenium, palladium, iron, nickel, cobalt, ruthenium, rhodium, osmium, iridium, or a combination thereof.

4. The sorbent composition of claim 1, wherein the transition metal comprises silver or iron.

5. The sorbent composition of claim 1, wherein the hydrocarbon fuel is a heavy hydrocarbon fuel.

6. The sorbent composition of claim 1, wherein the metal component is impregnated within micropores of the adsorbent support.

7. The sorbent composition of claim 1, wherein the sorbent composition removes from about 10 weight percent to about 90 weight percent sulfur, and from about 10 weight percent to about 90 weight percent vanadium based on a total weight of sulfur and vanadium, respectively, in the hydrocarbon fuel prior to contacting the fuel with the sorbent composition.

8. The sorbent composition of claim 1, wherein the organic adsorbent support is selected from the group consisting of activated carbon, coke, and charcoal.

9. A method of removing sulfur and vanadium from a hydrocarbon fuel, comprising:
contacting the fuel with a sorbent composition comprising:
an organic adsorbent support having a surface area in a range of from about 300 m$^2$/gram to about 800 m$^2$/gram; and
a metal component comprising a transition metal, wherein the metal component is impregnated on a surface of the adsorbent support; and
wherein the sorbent composition removes sulfur and vanadium from the hydrocarbon fuel.

10. The method of claim 9, wherein the adsorbent support is present in an amount between about 20 weight percent to about 99.9 weight percent based upon the weight of the sorbent composition.

11. The method of claim 9, wherein the metal component is present in an amount between about 0.1 weight percent to about 80 weight percent based upon the weight of the sorbent composition.

12. The method of claim 9, wherein the transition metal comprises copper, silver, platinum, gold, molybdenum, tungsten, rhenium, palladium, iron, nickel, cobalt, ruthenium, rhodium, osmium, iridium, or a combination thereof.

13. The method of claim 9, wherein the sorbent composition removes about 1.0 weight percent to about 100 weight percent sulfur based on the total weight of sulfur in the hydrocarbon fuel prior to contacting the fuel with the sorbent composition.

14. The method of claim 9, wherein the sorbent composition removes about 1.0 weight percent to about 100 weight percent vanadium based on a total weight of vanadium in the hydrocarbon fuel prior to contacting the fuel with the sorbent composition.

15. The method of claim 9, wherein the hydrocarbon fuel is a heavy hydrocarbon fuel.

\* \* \* \* \*